No. 718,922. PATENTED JAN. 20, 1903.
J. H. & H. H. DOW.
S. J. DOW, EXECUTRIX OF J. H. DOW, DEC'D.
SPEED CHANGING DEVICE.
APPLICATION FILED MAY 1, 1901.
NO MODEL. 2 SHEETS—SHEET 1.
- FIG. I -
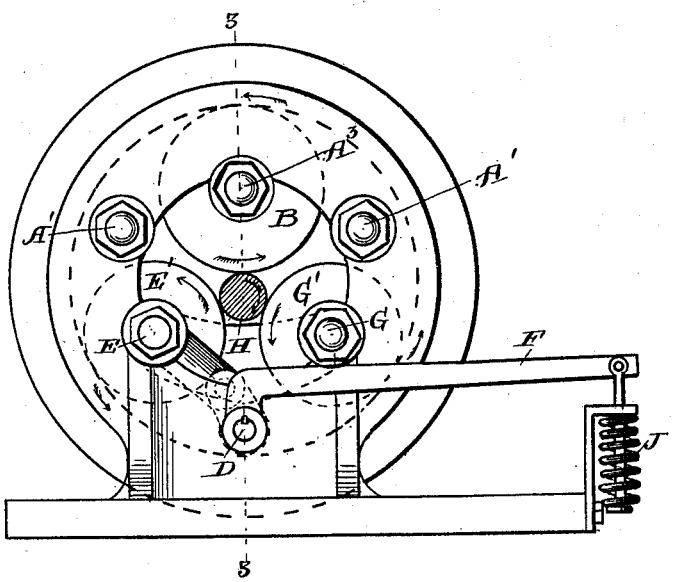
- FIG. II -
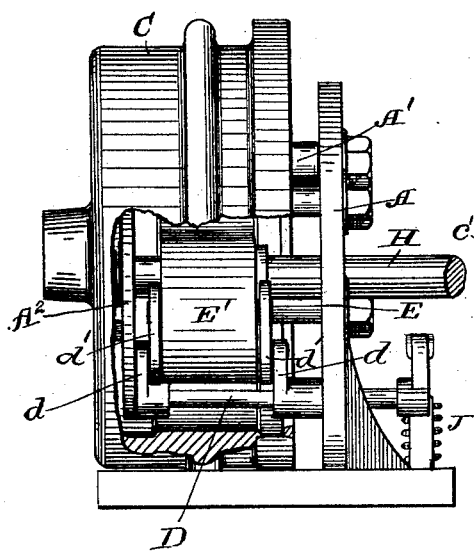
- FIG. III -
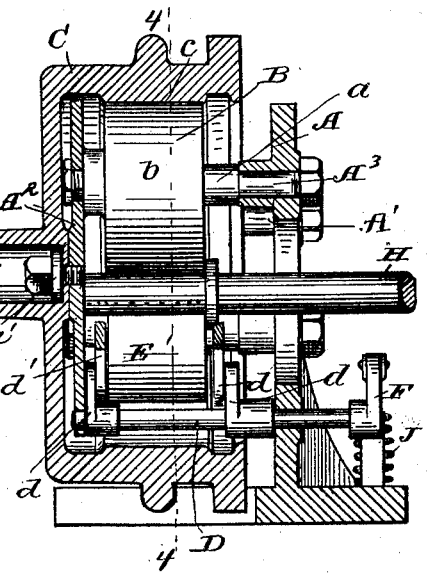
Witnesses,
J. C. Turner
N. E. Merkel
Inventors
J. H. & H. H. Dow
By J. B. Fay
Atty.

No. 718,922. PATENTED JAN. 20, 1903.
J. H. & H. H. DOW.
S. J. DOW, EXECUTRIX OF J. H. DOW, DEC'D.
SPEED CHANGING DEVICE.
APPLICATION FILED MAY 1, 1901.
NO MODEL. 2 SHEETS—SHEET 2.
FIG. IV.
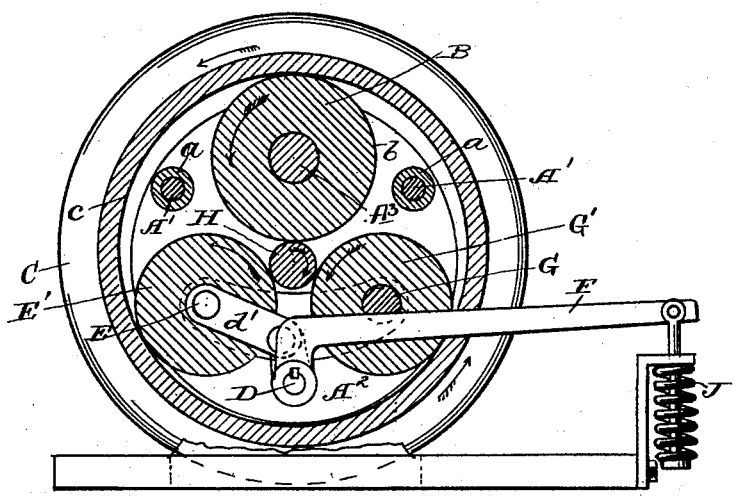
FIG. V.
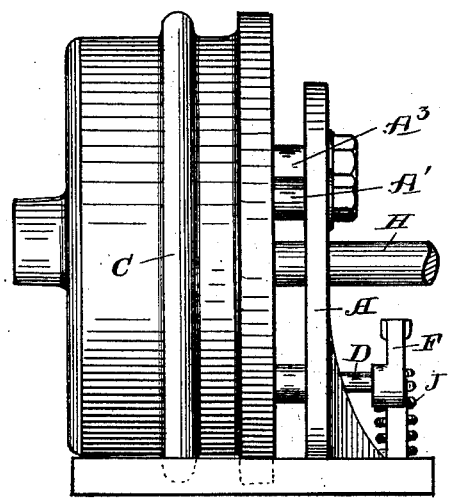
Witnesses,
J. C. Turner
A. E. Merkel.
Inventors
J. H. & H. H. Dow
By J. D. Fay
Atty.

UNITED STATES PATENT OFFICE.

SARAH J. DOW, EXECUTRIX OF JOSEPH H. DOW, DECEASED, AND HERBERT H. DOW, OF MIDLAND, MICHIGAN.

SPEED-CHANGING DEVICE.

SPECIFICATION forming part of Letters Patent No. 718,922, dated January 20, 1903.

Application filed May 1, 1901. Serial No. 58,366. (No model.)

*To all whom it may concern:*

Be it known that we, JOSEPH H. DOW, deceased, and HERBERT H. DOW, a citizen of the United States, and a resident of Midland, county of Midland, and State of Michigan, have invented a new and useful Improvement in Speed-Changing Devices, of which the following is a specification; the principle of the invention being herein explained, and the best mode in which the above have contemplated applying that principle, so as to distinguish it from other inventions.

The object of the invention is to provide means for transmitting motion from a rotating shaft having an excessively high speed through the medium of mechanism whereby the power from such shaft may be transmitted at a comparative low speed.

Said invention consists of means hereinafter fully described, and specifically pointed out in the claims.

The annexed drawings and the following description set forth in detail certain mechanism embodying the invention, such disclosed means constituting but one of various mechanical forms in which the principle of the invention may be used.

In said annexed drawings, Figure I represents a front elevation of a device embodying the invention. Fig. II represents an end elevation illustrating a portion broken away. Fig. III represents a transverse section taken upon the line 3 3 of Fig. I, showing parts in elevation. Fig. IV represents a vertical section taken upon the plane indicated by line 4 4, Fig. III; and Fig. V, an end elevation.

Upon a frame A are bolted two supporting-rods A', which project horizontally on such frame, as shown in Figs. II and III. To the inner extremities of said rods is secured by means of suitable nuts a plate $A^2$, Fig. III, at the upper portion of which is secured the inner end of a rod $A^3$, the outer end of such rod being secured in the frame A, as shown in Fig. III. The relative position of frame A and plate $A^2$ is maintained by means of tubular separators $a$. Upon said rod is journaled a roller B, having a cylindrical contact-surface $b$, upon which rests an interior cylindrical contact-surface $c$ of a rotatable drum C. In the lower portion of frame A is journaled a rock-shaft D, whose inner extremity is journaled in the lower portion of the plate $A^2$, as shown in Fig. III. Upon said shaft are secured two rocking arms $d$ $d$, to whose extremities are respectively journaled the extremities of two links $d'$ $d'$. Upon the other extremities of these links is mounted a rod E, and journaled upon said rod intermediate of the two links is a roller E'. Upon the extreme outer end of said shaft D is secured the end of a lever F, Fig. I. A third journal-rod G has its extremities in the plate and frame, respectively, and forms a bearing for a third roller G', Fig. I. The diameters of rollers E' and G' are preferably made equal, the diameter of roller B being made greater than that of roller E'. The inner diameter of the contact-surface $c$ of the rotatable drum C is made substantially equal to the diameter of the cylinder determined by the extreme outer elements of the contact-surface of said rollers B, E', and G'. A driving-shaft H, from which it is desired to transmit power at lower speed, projects between the three above-named rollers, as shown, and is of a diameter substantially equal to that of the cylinder determined by the extreme innermost elements of the contact-surfaces of said rollers, whereby said shaft may be caused to contact the surfaces of said three rollers simultaneously. The diameter of roller E' is caused to be greater than the difference between the radius of the cylindrical contact-surface of the drum and the sum of the radius of shaft H and the eccentricity of said drum-surface relatively to the shaft-surface, whereby it is seen that the roller E', being mounted upon a movable axis, may be caused to contact the shaft-surface and cylindrical drum-surface by moving said roller downwardly. Such effect is produced as a result of the relative location of the shaft and drum surfaces, these two surfaces approaching each other in the direction in which said movable roller is moved. The central portion of the drum C is provided with a square aperture $c'$, in which may be inserted a shaft to which it is desired to transmit the power. Said drum is steadied in its movement by means of a cylindrical washer $a'$, which bears in a cylindrical bearing formed at the inner end of said aperture $c'$, as shown in Fig. III.

A spring J may be operatively connected with the outer end of the lever F to maintain normal operative contact between the movable roller E' and the shaft and drum, as shown.

In operating the device the spring J is made sufficiently strong so as to maintain operative contact, as above described, and the direction of rotation of the shaft is that indicated by the arrow in Fig. I—that is, a direction such that the roller E' will not cause a wedging between the shaft and drum surfaces during rotation. Such wedging would result if the direction of rotation were opposite that shown, as will be readily understood.

When a spring such as is described is utilized, the tension thereof may be such as to normally maintain operative contact between the shaft and rollers, so that when it is desired to disconnect the speed-changing device from the shaft it is only necessary to lift the lever F by hand or by any suitable lever against the action of said spring sufficiently to reduce the frictional contact to a degree insufficient to effect such operative contact. When the load is considerable, such lifting need be but very slight to effect the disconnection, and when the required speed has been attained lever F is released to permit the spring J to resume its tension.

Other modes of applying the principle of the invention may be employed instead of the one explained, change being made as regards the mechanism herein disclosed, provided the means stated by any one of the following claims or the equivalent of such stated means be employed.

What is therefore particularly pointed out and distinctly claimed is—

1. In a speed-changing device, the combination with a rotatable drum, having an inner contact-surface, of a shaft; two rollers mounted on fixed axes, and in contact with said shaft, and drum, and a third roller, mounted on swinging bearings, and normally in contact with said shaft, and drum, and adapted to be moved out of contact with the shaft; one of the rollers on the fixed axes, having a larger diameter than the other two rollers, as herein set forth.

2. In a speed-changing device, the combination with a rotatable drum, having an inner contact-surface, of a shaft, eccentric to the axis of the drum; three rollers in contact with said shaft, and drum, two of said rollers having fixed axes, and the third mounted in swinging bearings, and normally in contact with said shaft, and drum, and adapted to be moved out of contact with the shaft; the diameter of one of the rollers on the fixed axes being larger than that of the other two, as herein set forth.

3. In a speed-changing device, the combination with a rotatable drum, having an inner contact-surface, of a shaft; a third roller, normally in contact with said shaft, and drum, and movable out of contact with the shaft; a rock-shaft, having rocking arms, links on which the third roller is mounted connected with said rocking arms, and means whereby the third roller may be moved out of contact with the shaft, substantially as set forth.

Signed by us this 29th day of April, 1901.

SARAH J. DOW,
*Executrix of the estate of Joseph H. Dow, deceased.*
HERBERT H. DOW.

Attest:
MARIA H. DOW,
FLORA M. THOMPSON.